United States Patent [19]
Pal et al.

[11] 4,205,235
[45] May 27, 1980

[54] AUTOMATIC ELECTRICAL LOAD MATCHING DEVICE FOR WIND GENERATORS

[75] Inventors: Dharam Pal; Kwang T. Huang, both of Ventura; Maurice N. Smith, Oxnard, all of Calif.

[73] Assignee: The United States of America as represented by the Secretary of the Navy, Washington, D.C.

[21] Appl. No.: 884,075

[22] Filed: Mar. 6, 1978

[51] Int. Cl.² ............................................. H02P 9/04
[52] U.S. Cl. .................................. 290/44; 290/40 R; 290/55; 307/29; 322/35
[58] Field of Search .................................. 290/42–44, 290/54, 55, 40 R, 40 B, 40 C, 40 F; 307/29, 38, 39, 41; 322/35

[56] References Cited
U.S. PATENT DOCUMENTS

| | | | |
|---|---|---|---|
| 2,148,804 | 2/1939 | Clayton | 290/44 |
| 2,339,749 | 1/1944 | Albers | 290/44 |
| 2,579,311 | 12/1951 | Fairey | 290/55 |
| 3,504,189 | 3/1970 | McHenry | 307/41 |

*Primary Examiner*—B. Dobeck
*Attorney, Agent, or Firm*—Richard S. Sciascia; Joseph M. St. Amand; Darrell E. Hollis

[57] ABSTRACT

An automatic electrical load matching device for applying loads to wind driven generators. The device switches five different loads to the output of a wind driven generator. Each load corresponds to a range of speeds of the wind driven generator's rotor.

7 Claims, 3 Drawing Figures

AUTOMATIC ELECTRICAL LOAD MATCHING DEVICE FOR WIND GENERATORS

BACKGROUND OF THE INVENTION

1. Field of the Invention

The present invention relates generally to the generation of power from wind generators and more particularly to a novel control system for utilizing the power generated by a wind generator.

2. Description of the Prior Art

A theoretical and empirical analysis of windmills reveals that the power output, P, of the windmill is directly proportional to the radius, R, of the blades, the speed, V, of the wind, the mass density, $\rho$, of the air in the wind and a power coefficient, $P_c$, according to the relationship $$P \alpha P_c \rho R^2 V^2.$$

The power coefficient, $P_c$, is also a function of wind speed. More particularly, it is a function of the geometrical arrangement of the windmill and of the tip speed ratio $2\pi NR/V$ where N is the angular velocity of the blades, and R and V are as previously defined.

The power coefficient, $P_c$, has been determined in wind tunnel tests for various blade arrangements. From the foregoing analysis in the tests referred to, it is found that for a given windmill there is an optimum angular velocity of the blades at which maximum power is obtained.

A further characteristic of winds which is of interest is the distribution of the wind velocities over a period of time.

Winds are ordinarily classified in two groups, prevalent winds and energy winds. In wind studies, it is found that prevalent winds blow about 75 percent of the time and energy winds blow about 25 percent of the time. Energy winds however have average velocities about 2.3 times those of prevalent winds and therefore contain about 75 percent of the total energy generated by winds.

Since, theoretically a maximum of only 59.3 percent of the power in the wind is obtainable by a windmill to do work and that in practice only 30-40 percent is actually obtained using the most efficient windmills presently known, it is extremely desirable to not only have a more efficient system but one which is efficient over a wide range of wind velocities. Yet, it is known that conventional windmills employed in the generation of electrical energy typically operate only at relatively low wind velocities and therefore do not take advantage of the energy available at higher wind velocities.

For achieving maximum efficiency of conversion, commercial wind generators are desired to operate at a fixed wind speed to rotor tip speed ratio. Because of the random nature of the wind, an a.c. generator driven by wind powered rotor will deliver electricity with variable voltage and frequency between the cut-in and rated speed range of the wind power system. The variable frequency power if supplied to a motor driven appliance will cause the appliance to operate at irregular speeds.

Further, to maintain the cost per kilowatt hour of energy produced as low as possible, it is essential to utilize fully the output from the wind generator. That is, the generated power between cut-in and rated speed should be utilized by matching the load to the generator's momentary capacity. This load matching involves following the generator's output versus wind speed characteristics over its operating range by an infinitely variable load. Of course, it is impossible to obtain an infinitely variable load, so in practice, the available load may be divided into a series of small units with each load switched in and out of the circuit to match the generator's instantaneous output.

SUMMARY OF THE INVENTION

The present invention provides an automatic electrical load matching device for applying loads to wind driven generators. The device selectively switches five different loads to the output of the wind driven generator in response to the speed of the wind driven generator's rotor. When the speed of the wind driven generator's rotor is not sufficient to supply a particular load, the load is supplied with electrical power from a utility.

It is therefore an object of the present invention to provide an improved automatic electrical load matching device for a wind generator.

Other objects and further scope of applicability of the present invention will become apparent from the detailed description given hereinafter. The detailed description indicates the preferred embodiments of the invention that is given by way of illustration only since various changes and modifications within the spirit and scope of the invention will become apparent to those skilled in the art from this detailed description. It should be understood that the foregoing abstract of the disclosure is for the purpose of providing a non-legal brief statement to serve as a search scanning tool for scientists, engineers and researchers and is not intended to limit the scope of the invention as disclosed herein nor is it intended that it should be used in interpreting or in any way limiting the scope or fair meaning of the appended claims.

DETAILED DESCRIPTION OF THE PREFERRED EMBODIMENTS

Figure 1:
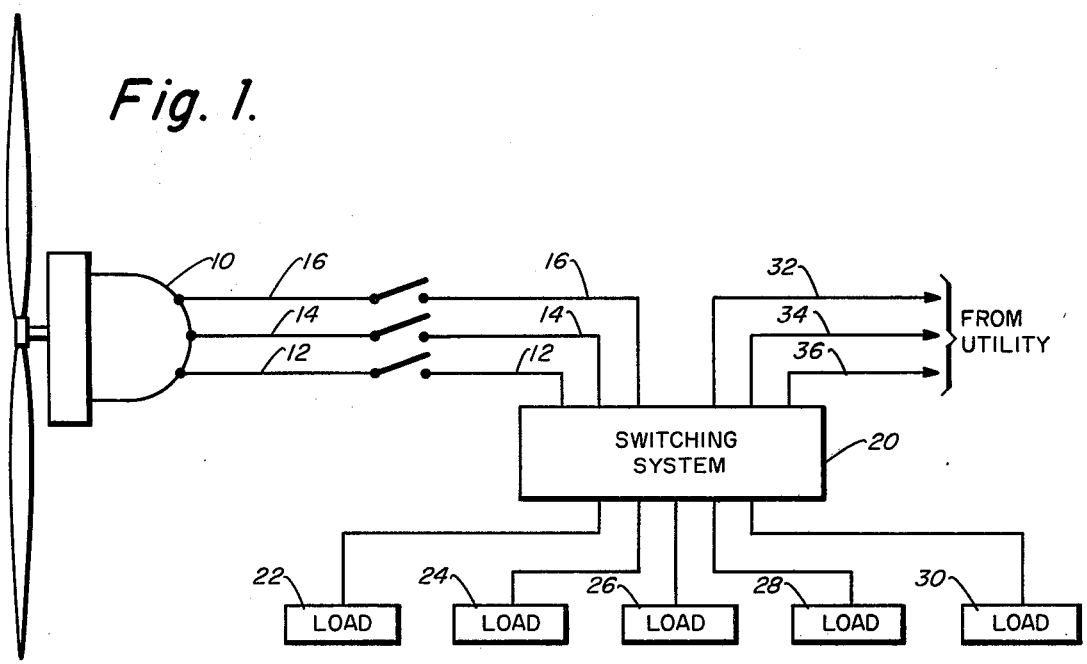
FIG. 1 is a schematic drawing illustrating the operation of the preferred embodiment of the invention.

Referring to FIG. 1, there is provided a wind generator 10 for generating three-phase power on lines 12, 14 and 16. The three-phase power appearing on lines 12, 14 and 16 of wind generator 10 is coupled to switching system 20 which selectively distributes power to loads 22, 24, 26, 28 and 30 depending upon the speed of the rotor of wind generator 10. Switching system 20 detects the frequency of the AC power on lines 12, 14 and 16 which is proportional to the speed of the rotor of wind generator 10. Switching system 20 directs three-phase power to loads 22, 24, 26, 28 and 30 from lines 12, 14 and 16 or from lines 32, 34 and 36. Three-phase power on lines 32, 34 and 36 is provided by a utility company. As the wind velocity increases, thereby increasing the rotational speed of wind generator 10, switching system 20 connects more loads 22–30 to three-phase power on lines 12, 14 and 16 while simultaneously disconnecting the loads from three-phase power on lines 32, 34 and 36.

Figure 3:
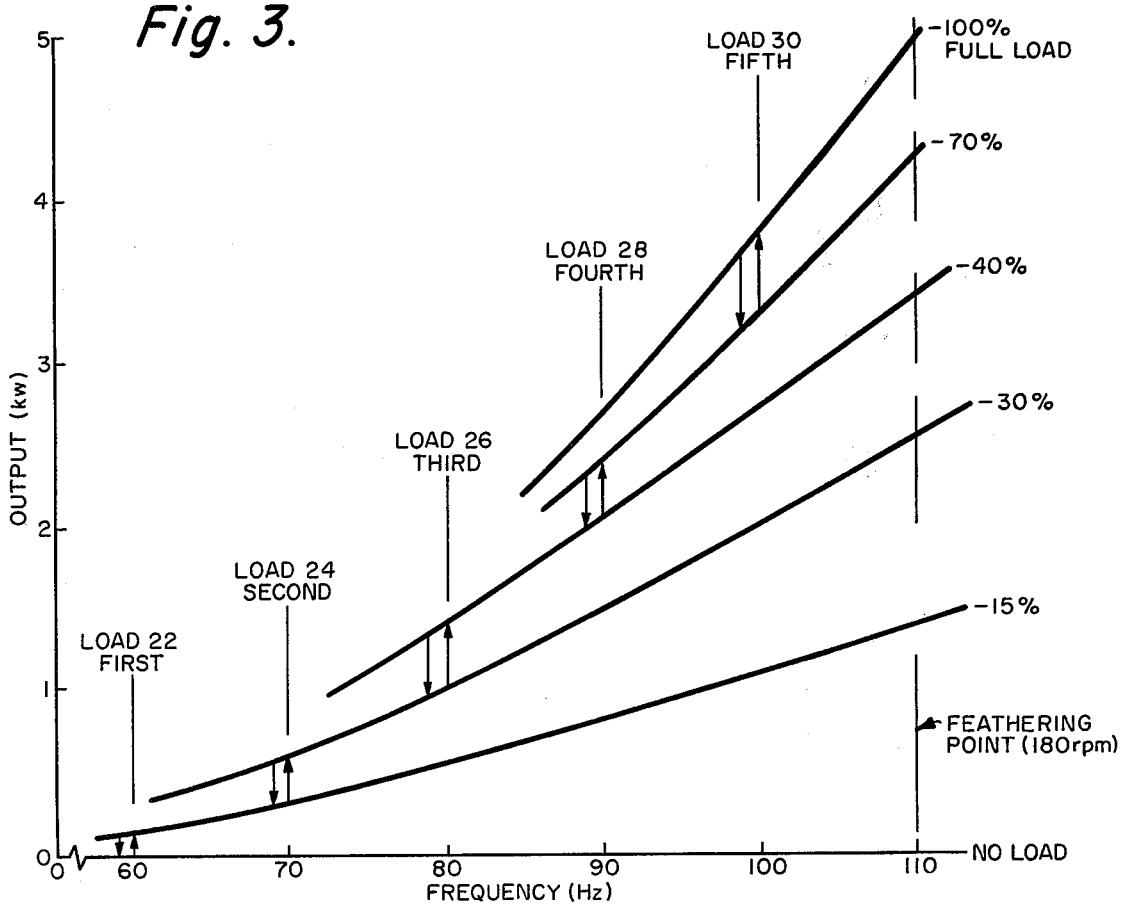
FIG. 3 is a graph illustrating the operating characteristics of the circuit shown in FIG. 2.

FIG. 3 illustrates the characteristics of a five kilowatt wind generator similar to wind generator 10 of FIG. 1. The frequency of the power generated which is proportional to the wind speed or wind velocity is shown along the abscissa while the output power in kilowatts is shown along the ordinate. It is noted that at 60 Hz the first load or load 22 of FIG. 1 is switched from utility power on lines 32, 34, and 36 to the power on lines 12, 14 and 15 from wind generator 10. When the frequency of the AC power generated by wind generator 10 reaches approximately 70 Hz, switching system 20 switches load 24 from the utility power lines 32 through 36 to the wind generator power lines 12 through 16. At approximately 80 Hz, load 26 is switched onto the A.C. power generated by wind generator 10. Then at 90 Hz, load 28 is switched onto the A.C. power generated by wind generator 10 and finally at 100 Hz, load 30 is switched to receive power from wind generator 10. Of course, as the wind velocity decreases and the frequency of the A.C. power generated by wind generator 10, decreases load 22 through 30 are correspondingly switched from A.C. power generated by wind generator 10 to the power from the utility.

Figure 2:
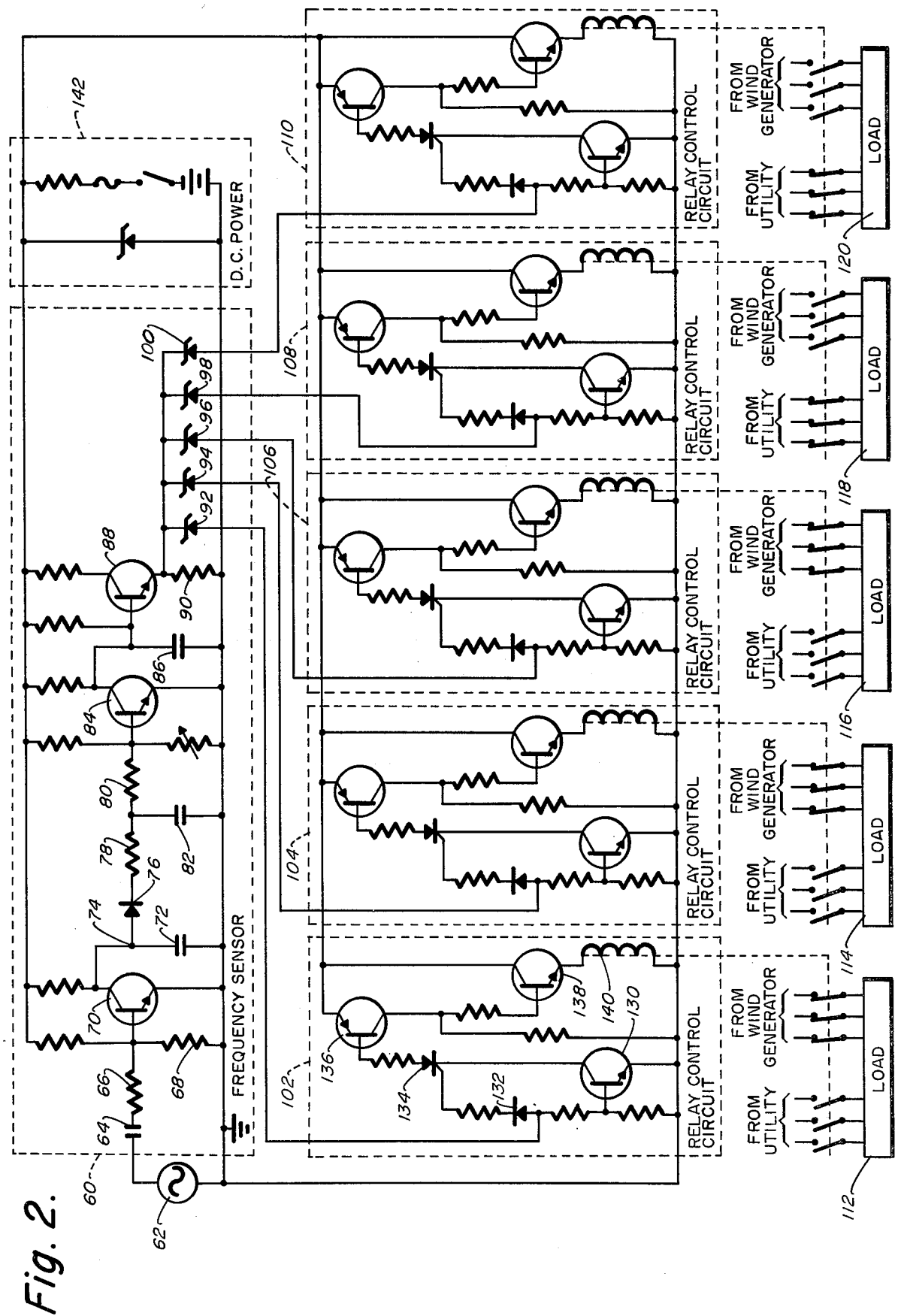
FIG. 2 is a schematic drawing of the switching system of the embodiment illustrated in FIG. 1.

Now turning to FIG. 2, the switching system of FIG. 1 is shown in greater detail. A.C. source 62 represents a single phase of the A.C. power generated by wind generator 10. It is noted that the amplitude and frequency of all three phases generated by wind generator 10 are substantially equal, therefore a single phase of the three phase power may be monitored to control the switching of all three phases of the A.C. power. However, if desired, all three phases of the A.C. power generated by wind generator 10 may be monitored by circuits similar to the one shown in FIG. 2.

The single phase A.C. power from source 62 is coupled to transistor 70 through D.C. blocking capacitor 64, resistor 66 and 68. This results in capacitor 72 being discharged and charged at a rate corresponding to the frequency of the A.C. input signal from source 62. Thus, the maximum voltage across capacitor 72 depends directly on the frequency of the A.C. input signal from source 62. That is, as the frequency of the A.C. input signal from source 62 increases, a decrease in the peak terminal voltage of capacitor 72 results.

This peak terminal voltage at point 74 is half-wave rectified by diode 76. The half-wave rectified signal is then smoothed by the filter comprised of resistors 78 and 80 and capacitor 82. The smoothed signal is then passed to the base of transistor 84 whose collector is coupled to Charging capacitor 86. As the peak voltage at terminal 74 increases the corresponding D.C. voltage across capacitor 86 decreases. The D.C. voltage across capacitor 86 is then passed through transistor 88 appearing across resistor 90. Therefore, as the frequency of the A.C. input signal from source 62 increases, the peak terminal voltage appearing at terminal 74 decreases while the D.C. voltage across capacitor 86 and hence resistor 90 increases. Thus, the D.C. control signal appearing across resistor 90 is proportional to the frequency of the A.C. source 62. As the frequency of A.C. source 62 increases, so does the D.C. control signal appearing across resistor 90.

D.C. control voltage appearing across resistor 90 is coupled to zener diode 92 through 100. Zener diodes 92 through 100 have increasing voltage breakdown ratings in the order that the breakdown voltage across zener diode 94 is greater than that across zener diode 92 while the breakdown voltage of zener diode 96 is greater than that of zener diode 94 and zener diode 92, etc. with the breakdown voltage of zener diode 100 being greater than that of zener diode 92 or zener diode 94 or zener diode 96 or zener diode 98. Thus, as the voltage level of the D.C. control voltage across resistor 90 increases, zener diode 92 is first activated or becomes a short. A further increase in the voltage level of the D.C. control voltage appearing across register 90 will activate or short zener diode 94. And correspondingly, zener diode 96, 98 and 100 will be activated or shorted with increasing voltage level of the D.C. control signal across resistor 90. As each zener diode 92 through 100 is activated or shorted, respective relay control circuits 102 through 110 are actuated such that respective loads 22 through 30 are switched from utility power to power generated by wind generator 10. As is shown in FIG. 2, loads 22, 24 and 26 are operating on A.C. power generated by wind generator 10 while loads 28 and 30 are operating on A.C. power from the utility.

Each relay control circuit 102 through 110 is identical in configuration and operation. Thus, only relay control circuit 102 will be described in detail. As the D.C. control voltage across resistor 90 increases to the point where zener diode 92 shorts or is inactivated, transistor 130 is turned "on". However, diode 132 remains off as its cut-in voltage is approximately a half a volt greater than the voltage required to turn "on" transistor 130. When the voltage level of the D.C. control voltage across resistor 90 reaches the cut-in level for diode 132, diode 132 is turned "on" which in turn turns "on" silicon-control-rectifier 134 which turns "on" transistor 136 which turns "on" transistor 138 thereby energizing coil 140 with D.C. power from D.C. power source 142. When relay coil 140 is energized, load 22 is switched from utility power to power generated by wind generator 10.

However, when the wind velocity decreases, with the voltage level of the D.C. control voltage across resistor 90 decreasing to the point where diode 132 stops conducting, transistor 130 will remain "on" therefore keeping silicon-control-rectifier 134 and transistors 136 and 138 "on". However, once the voltage across resistor 90 drops below the level required to maintain transistor 130 in the "off" state, transistor 130 will turn off thereby turning silicon-control-rectifier 134, transistor 136 and 138 off. This deenergizes relay coil 140 which switches load 112 from receiving power from wind generator 10 to receiving power from the utility. Thus, diode 132 provides a hysteresis effect so that relay 140 will not be energized and deenergized by minor fluctuations of the D.C. control voltage across resistor 90 about the voltage level necessary to activate zener diode 92.

Turning to FIG. 3 and relating FIG. 3 to the circuit of FIG. 2 the breakdown voltage level of zener diode 92 corresponds to the voltage level of D.C. control signal appearing across resistor 90 when the frequency of the A.C. input signal from source 62 is approximately 60 Hz. Thus, when the frequency of the A.C. power generated by wind generator 10 is approximately 60 Hz, the circuit of FIG. 2 will switch load 22 from utility power to A.C. power generated by wind generator 10. Likewise, the breakdown voltages of zener diodes 94, 96, 98 and 100 correspond to the voltage level of the D.C. control signal which would appear across resistor 90 when the frequency of A.C. input source 62 is respectively 70, 80, 90 and 100 Hz.

As is shown by FIG. 3, the switching system 20 allows full utilization of the A.C. power generated by wind generator 10 in its range between cut-in and rated speed.

As the loads 22 through 30 are being switched in and out from A.C. power generated by wind generator 10 to that generated by the utility, a change in torque at the shaft of wind generator 10 results which causes a change in the speed of the rotor of wind generator 10 thus causing a change in frequency of the generated A.C. power on lines 12 through 16. This results in an instability in the relay control circuits 102 through 110. The unstable operation of the relay control circuits 102 through 110 may be collected by introducing a frequency delay when switching the load from wind generator 10 to utility power.

Therefore many modifications and embodiments of this specific invention will readily come to mind to one skilled in the art having the benefit and teachings in the foregoing description in accompanying drawings in the subject invention. Hence, it is to be understood that the invention limited thereto and that such modifications, etc., are intended to be included in the scope of the appended claims.

What is claimed is:

1. In a device having a rotatable means responsive to a moving fluid having a variable velocity, said device generating alternating current power having a frequency related to the velocity of said fluid, apparatus responsive to the frequency of the generated power for selectively coupling and decoupling the generated power to a plurality of loads, which comprises:
   a. means for generating a direct current signal proportional to the frequency of the generated power; and
   b. switch means responsive to said direct current signal for selectively coupling and decoupling the generated power to the plurality of loads.

2. Apparatus as recited in claim 1 wherein said means for generating a direct current signal proportional to the frequency of the generated power includes:
   a. a first transistor having its base coupled to receive a portion of the generated power, its emitter coupled to a first reference potential, and a collector;
   b. a capacitor coupled between the collector of said first transistor and said first reference potential, the amplitude of the signal across said capacitor decreasing as the frequency of the generated power increases;
   c. means for rectifing the signal across said capacitor;
   d. a second transistor having its base coupled to receive said rectified signal and its emitter coupled to said first reference potential;
   e. a second capacitor coupled between the collector of said second transistor and said first reference potential;
   f. a third transistor having its base coupled to the collector of said second transistor; and
   g. a resistor coupled between the emitter of said third transistor and said first reference potential, the signal across said resistor being a direct current signal increasing in amplitude as the frequency of the generated power increases.

3. The apparatus as recited in claim 1 or 2 wherein said switch means includes:
   a. a plurality of zener diodes respectively exhibiting a plurality of differing breakdown voltage levels, the cathode of said plurality of zener diodes being coupled to receive said direct current signal;
   b. a plurality of relay control circuits, one of said plurality of relay control circuits coupled between the anode of one of said plurality of zener diodes and one of said plurality of loads.

4. The apparatus of claim 3 wherein each said relay control circuit includes means for supplying hystersis such that the voltage level of said direct current signal required to decouple one of said loads from said generated power is less than the voltage level of said direct current signal required to couple that same load to said generated power.

5. The apparatus of claim 4 wherein said hysteresis means includes:
   a. a silicon-controlled rectifier having a cathode, an anode, and a gate;
   b. a fourth transistor having a base, a collector, and an emitter, said collector being coupled to said rectifier cathode, said emitter being coupled to said first reference potential, said base being coupled to the anode of one of said plurality of zener diodes;
   c. a diode having its cathode coupled to said gate of said silicon-controlled rectifier and its anode coupled to said base of said fourth transistor;
   d. a fifth transistor having a collector, an emitter, and a base, said base being coupled to said silicon-controlled rectifier anode, said emitter being coupled to a second reference potential, said collector being coupled to said first reference potential.

6. The apparatus of claim 5 further comprising:
   a. a sixth transistor having a collector, a base, and an emitter, said sixth transistor base being coupled to said fifth transistor collector, said sixth transistor collector being coupled to said second reference potential;
   b. a relay coil being coupled between said sixth transistor emitter and said first reference potential.

7. The apparatus of claim 1 wherein said switch means includes:
   means for selectively coupling an alternate power source to said plurality of loads when said switch means selectively decouples the generated power from said plurality of loads.

* * * * *